US009812677B2

(12) United States Patent
Mank et al.

(10) Patent No.: US 9,812,677 B2
(45) Date of Patent: Nov. 7, 2017

(54) REDUCING POUCH THICKNESSES IN BATTERY CELLS FOR PORTABLE ELECTRONIC DEVICES

(71) Applicant: Apple Inc., Cupertino, CA (US)

(72) Inventors: Richard M. Mank, Cupertino, CA (US); Taisup Hwang, Santa Clara, CA (US)

(73) Assignee: Apple Inc., Cupertino, CA (US)

( * ) Notice: Subject to any disclaimer, the term of this patent is extended or adjusted under 35 U.S.C. 154(b) by 520 days.

(21) Appl. No.: 13/872,951

(22) Filed: Apr. 29, 2013

(65) Prior Publication Data

US 2014/0322590 A1  Oct. 30, 2014
US 2016/0181575 A9  Jun. 23, 2016

Related U.S. Application Data

(60) Provisional application No. 61/776,034, filed on Mar. 11, 2013.

(51) Int. Cl.
H01M 2/02 (2006.01)
H01M 10/052 (2010.01)
H01M 10/04 (2006.01)
H01M 10/058 (2010.01)

(52) U.S. Cl.
CPC ........ *H01M 2/0275* (2013.01); *H01M 2/026* (2013.01); *H01M 2/0212* (2013.01); *H01M 2/0277* (2013.01); *H01M 2/0287* (2013.01); *H01M 10/049* (2013.01); *H01M 10/0436* (2013.01); *H01M 10/052* (2013.01); *H01M 10/058* (2013.01); *H01M 2220/30* (2013.01); *Y10T 156/10* (2015.01); *Y10T 156/1002* (2015.01)

(58) Field of Classification Search
CPC ............. H01M 2/0275; H01M 2/0277; H01M 2/0285; H01M 2/0295
See application file for complete search history.

(56) References Cited

U.S. PATENT DOCUMENTS

2013/0196214 A1* 8/2013 Scott et al. .................... 429/174
2014/0113184 A1* 4/2014 Hamel ............. H01M 10/0436
429/179

* cited by examiner

Primary Examiner — Ladan Mohaddes
(74) Attorney, Agent, or Firm — Polsinelli PC

(57) ABSTRACT

The disclosed embodiments provide a battery cell. The battery cell includes a set of layers including a cathode with an active coating, a separator, and an anode with an active coating. The battery cell also includes a pouch enclosing the layers, which contains a first layer of polyether ether ketone (PEEK).

17 Claims, 6 Drawing Sheets

POUCH COMPOSITION 410

| POLYURETHANE 412 |
| --- |
| PEEK 414 |
| ALUMINUM 418 |
| PEEK 416 |
| ALUMINUM 420 |
| POLYPROPYLENE/OLEFIN 422 |

FIG. 4

REDUCING POUCH THICKNESSES IN BATTERY CELLS FOR PORTABLE ELECTRONIC DEVICES

RELATED APPLICATION

This application claims priority under 35 U.S.C. §119 to U.S. Provisional Application No. 61/776,034, entitled "Reducing Pouch Thicknesses in Battery Cells for Portable Electronic Devices," by Richard M. Mank and Taisup Hwang, filed 11 Mar. 2013, the contents of which are herein incorporated by reference in their entirety.

BACKGROUND

Field

The disclosed embodiments relate to batteries for portable electronic devices. More specifically, the disclosed embodiments relate to techniques for reducing the thickness of pouches for batteries in portable electronic devices.

Related Art

Rechargeable batteries are presently used to provide power to a wide variety of portable electronic devices, including laptop computers, tablet computers, mobile phones, personal digital assistants (PDAs), digital music players and cordless power tools. The most commonly used type of rechargeable battery is a lithium battery, which can include a lithium-ion or a lithium-polymer battery.

Lithium-polymer batteries often include cells that are packaged in flexible pouches. Such pouches are typically lightweight and inexpensive to manufacture. Moreover, these pouches may be tailored to various cell dimensions, allowing lithium-polymer batteries to be used in space-constrained portable electronic devices such as mobile phones, laptop computers, and/or digital cameras. For example, a lithium-polymer battery cell may achieve a packaging efficiency of 90-95% by enclosing rolled electrodes and electrolyte in an aluminized laminated pouch. Multiple pouches may then be placed side-by-side within a portable electronic device and electrically coupled in series and/or in parallel to form a battery for the portable electronic device. Consequently, the use of portable electronic devices may be facilitated by improvements related to the packaging efficiency, capacity, form factor, design, and/or manufacturing of battery packs containing lithium-polymer battery cells.

SUMMARY

The disclosed embodiments provide a battery cell. The battery cell includes a set of layers including a cathode with an active coating, a separator, and an anode with an active coating. The battery cell also includes a pouch enclosing the layers, which contains a first layer of polyether ether ketone (PEEK).

In some embodiments, the pouch also includes a first layer of aluminum and a layer of polypropylene.

In some embodiments, the first layer of aluminum is disposed between the first layer of PEEK and the layer of polypropylene.

In some embodiments, the pouch also includes a layer of adhesive disposed between the first layer of PEEK and the first layer of aluminum. The layer of adhesive may be omitted if the first layer of aluminum is bonded to the first layer of PEEK using a vapor-deposition technique.

In some embodiments, the first layer of aluminum has a thickness in the range of 25-30 microns, and the layer of polypropylene has a thickness in the range of 15-25 microns.

In some embodiments, the pouch also includes a second layer of aluminum, and the first layer of PEEK is disposed between the first and second layers of aluminum.

In some embodiments, the first layer of PEEK has a thickness in the range of 5-10 microns.

In some embodiments, the pouch also includes a second layer of PEEK.

In some embodiments, the first layer of PEEK includes a PEEK material and a scrim.

In some embodiments, the pouch is formed using a vacuum-forming technique. After the pouch is formed, the layers may be sealed in the pouch using a laser-sealing technique.

BRIEF DESCRIPTION OF THE FIGURES

FIG. 4 shows an exemplary set of layers in a pouch for a battery cell in accordance with the disclosed embodiments.

In the figures, like reference numerals refer to the same figure elements.

DETAILED DESCRIPTION

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing code and/or data now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, methods and processes described herein can be included in hardware modules or apparatus. These modules or apparatus may include, but are not limited to, an application-specific integrated circuit (ASIC) chip, a field-programmable gate array (FPGA), a dedicated or shared processor that executes a particular software module or a piece of code at a particular time, and/or other programmable-logic devices now known or later developed. When the hardware modules or apparatus are activated, they perform the methods and processes included within them.

Figure 1:
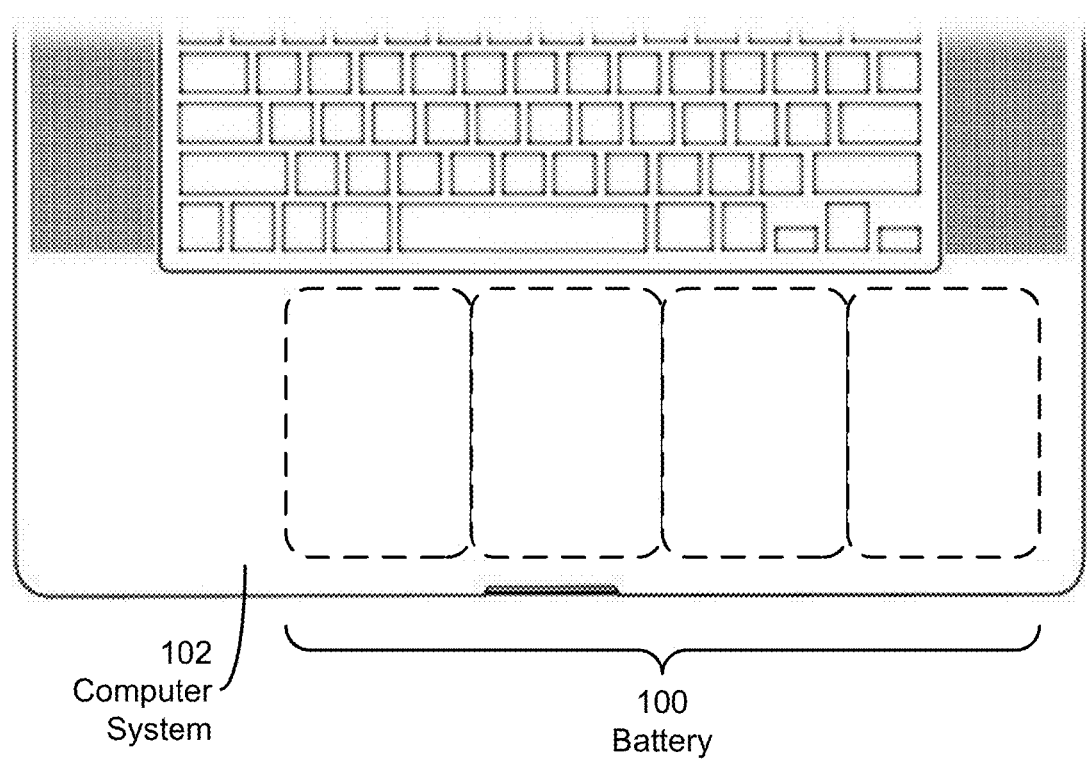
FIG. 1 shows the placement of a battery in a computer system in accordance with the disclosed embodiments.

FIG. 1 shows the placement of a battery 100 in a computer system 102 in accordance with an embodiment. Computer system 102 may correspond to a laptop computer, personal digital assistant (PDA), portable media player, mobile phone, digital camera, tablet computer, and/or other portable electronic device. Battery 100 may correspond to a lithium-polymer battery and/or other type of rechargeable power source for computer system 102. For example, battery 100 may include one or more lithium-polymer battery cells packaged in flexible pouches. The battery cells may then be connected in series and/or in parallel and used to power computer system 102.

In one or more embodiments, battery 100 is designed to accommodate the space constraints of computer system 102. For example, battery 100 may include battery cells of different sizes and thicknesses that are placed side-by-side, top-to-bottom, and/or stacked within computer system 102 to fill up the free space within computer system 102. The use of space within computer system 102 may additionally be optimized by omitting a separate enclosure for battery 100. For example, battery 100 may include non-removable pouches of lithium-polymer cells encased directly within the enclosure for computer system 102. As a result, the cells of battery 100 may be larger than the cells of a comparable removable battery, which in turn may provide increased battery capacity and weight savings over the removable battery.

Figure 2:
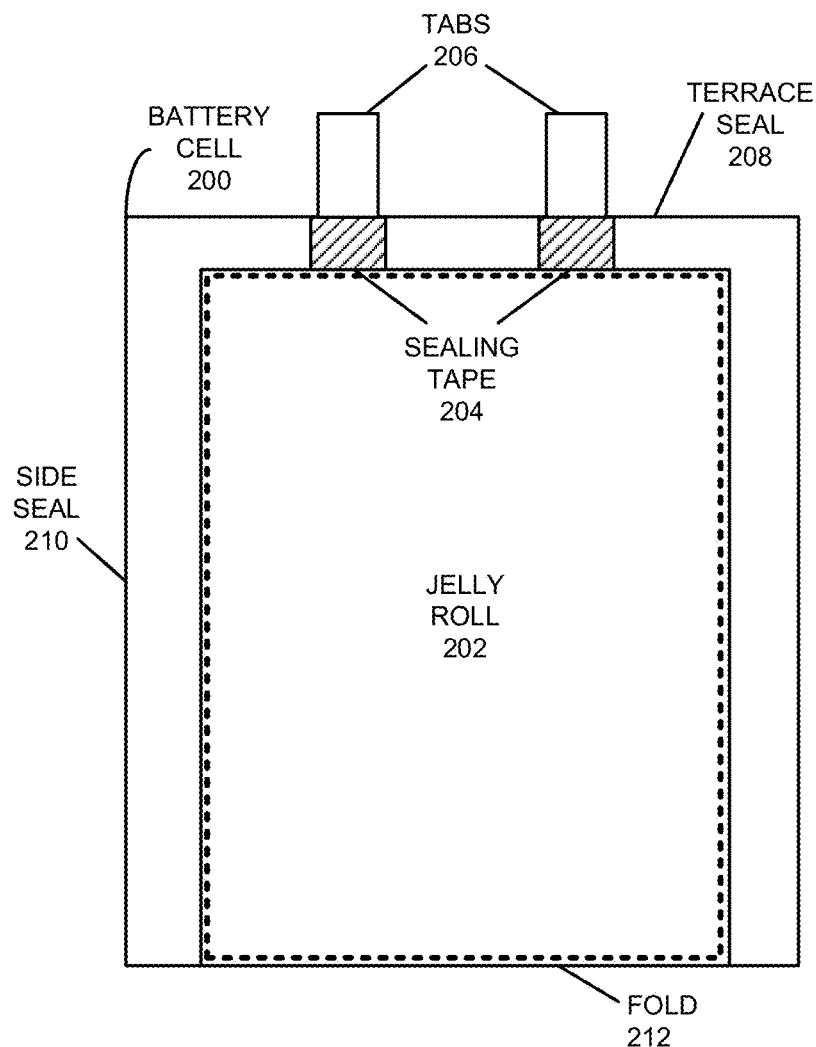
FIG. 2 shows a battery cell in accordance with the disclosed embodiments.

FIG. 2 shows a battery cell 200 in accordance with an embodiment. Battery cell 200 may correspond to a lithium-polymer cell that is used to power a portable electronic device. For example, battery cell 200 may be used in a battery pack that supplies power to components of a computer system, such as computer system 102 of FIG. 1. Battery cell 200 includes a jelly roll 202 containing a number of layers which are wound together and/or stacked, including a cathode with an active coating, a separator, and an anode with an active coating.

More specifically, jelly roll 202 may include one strip of cathode material (e.g., aluminum foil coated with a lithium compound) and one strip of anode material (e.g., copper foil coated with carbon) separated by one strip of separator material (e.g., conducting polymer electrolyte). The cathode, anode, and separator layers may then be wound on a mandrel to form a spirally wound structure. Alternatively, the layers may be used to form other types of battery cell structures. For example, the layers may be stacked to form bi-cell and/or stacked-cell structures. Jelly rolls are well known in the art and will not be described further.

During assembly of battery cell 200, jelly roll 202 is enclosed in a flexible pouch, which is formed by folding a flexible sheet along a fold line 212. For example, the flexible sheet may be made of aluminum with a polymer film, such as polypropylene and/or polyethylene. To improve the puncture resistance of the pouch, a layer of nylon may be disposed over the aluminum. After the flexible sheet is folded, the flexible sheet can be sealed, for example, by applying heat along a side seal 210 and along a terrace seal 208.

Jelly roll 202 also includes a set of conductive tabs 206 coupled to the cathode and the anode. Conductive tabs 206 may extend through terrace seal 208 (for example, formed using sealing tape 204) to provide terminals for battery cell 200. Conductive tabs 206 may then be used to electrically couple battery cell 200 with one or more other battery cells to form a battery pack. For example, the battery pack may be formed by coupling the battery cells in a series, parallel, or series-and-parallel configuration.

As mentioned above, battery cell 200 may accommodate the space constraints of a portable electronic device. As a result, the dimensions of battery cell 200 may accommodate the dimensions of the portable electronic device. For example, battery cell 200 may be more than 80-mm wide and 130-mm long but have a thickness of less than 3 mm to fit into a tablet computer and/or other device with a relatively thin form factor. As the thickness of battery cell 200 decreases, the proportion of the thickness occupied by the pouch enclosing jelly roll 202 may increase. As a result, the volumetric energy density of battery cell 200 may be lower than that of a thicker battery cell enclosed in the same type of pouch.

In one or more embodiments, the energy density of battery cell 200 is increased by reducing the thickness of the pouch enclosing battery cell 200. For example, a 1.5-mm thick battery cell 200 may include a pouch that is 91 microns thick, which occupies 12.1% of the overall thickness of battery cell 200. If the thickness of the pouch material is reduced to 55 microns, the pouch thickness may be reduced to 7.3% of the overall thickness, enabling a corresponding increase in the capacity and/or energy density of battery cell 200. To achieve such a reduction in pouch thickness, the pouch may include one or more layers of polyether ether ketone (PEEK). As discussed in further detail below with respect to FIGS. 3-4, the layer(s) of PEEK may provide the same puncture and/or moisture resistance of thicker layers of nylon, aluminum, and/or other pouch materials, thus reducing the amount of overall thickness in battery cell 200 occupied by the pouch without compromising the integrity of battery cell 200.

Figure 3:
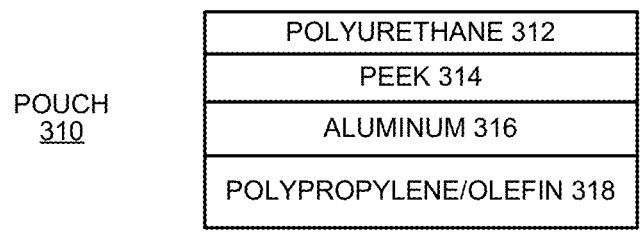
FIG. 3 shows an exemplary set of layers in a pouch for a battery cell in accordance with the disclosed embodiments.

FIG. 3 shows an exemplary set of layers 312-318 in a pouch 310 for a battery cell (e.g., battery cell 200 of FIG. 2) in accordance with the disclosed embodiments. Pouch 310 includes a PEEK layer 314, which resides on top of an aluminum layer 316 that keeps moisture out. Pouch 310 may also include an optional top layer of polyurethane 312 to reduce reflectivity and provide a matte finish. Finally, pouch 310 may include a bottom protective layer 318 that may be polypropylene and/or olefin. During sealing of the battery cell in pouch 310, heat and/or pressure may be applied to seals in pouch 310. The heat and/or pressure may melt layer 318 around the seals and cause the melted material to flow together, thus forming a hermetic enclosure around the battery cell.

As mentioned above, PEEK layer 314 may provide the puncture resistance of one or more thicker layers of a conventional pouch for the battery cell. For example, PEEK layer 314 may include a film of PEEK material with a thickness in the range of 5-10 microns. PEEK layer 314 may replace a nylon layer that is typically 15-25 microns thick while providing the same puncture resistance as the nylon layer. To further improve the puncture resistance and/or mechanical properties of PEEK layer 314, PEEK layer 314 may include a scrim of PEEK filament and/or another reinforcing material embedded in the film of PEEK material.

Similarly, the moisture resistance of the PEEK material in PEEK layer 314 may enable a reduction in the thicknesses of other layers 316-318 in pouch 310. For example, a conventional pouch for a battery cell may have an aluminum layer that is 35-40 microns thick and a layer of propylene that is 15-25 microns thick, while the use of PEEK layer 314 in pouch 310 may enable a reduction in the thickness of aluminum layer 316 to 25-30 microns.

During manufacture of pouch 310, PEEK layer 314 may be disposed over aluminum layer 316 by disposing an adhesive (not shown) between layers 314-316. The adhesive may include ink that acts as a colorant. For example, the adhesive may include black ink that causes the outside of the battery cell to appear black. On the other hand, the temperature stability of PEEK layer 314 may allow aluminum layer 316 to be bonded directly to PEEK layer 314 using a vapor-deposition technique and/or another technique. Such direct bonding may omit the adhesive from pouch 310 and provide a further reduction in the thickness of pouch 310.

One or more layers of PEEK material may also replace other layers in pouch 310. For example, pouch 310 may include multi-laminate layers of PEEK material that provide adequate puncture and moisture resistance to the battery cell. As a result, aluminum layer 316 may be omitted from pouch 310, and the thickness of layer 318, which normally insulates aluminum layer 316 from the battery cell, may be reduced. In turn, a cup in pouch 310 to accommodate the battery cell may be formed using a vacuum-forming technique, which may be preferable to a punching technique that may produce cracks in the polypropylene layer of a conventional pouch and create an electrical junction between the aluminum layer of the conventional pouch and the battery cell. Moreover, the use of PEEK material in pouch 310 may allow the battery cell to be sealed in the pouch using a laser-sealing technique instead of a heat-sealing technique. Because the laser-sealing technique does not form a seal that protrudes past the side of the battery cell, pouch 310 may provide additional space savings over a battery cell with protruding seals that are formed using the heat-sealing technique.

FIG. 4 shows an exemplary set of layers in a pouch 410 for a battery cell in accordance with the disclosed embodiments. As with pouch 310 of FIG. 3, pouch 410 includes a bottom protective layer 422 of polypropylene and/or olefin and/or an optional top layer of polyurethane 412.

However, unlike pouch 310 of FIG. 3, pouch 410 includes multiple alternating layers of PEEK 414-416 and aluminum 418-420. For example, a first layer of aluminum 420 may be disposed over the bottom layer 422, a first layer of PEEK 416 may be disposed over aluminum layer 420, a second layer of aluminum 418 may be disposed over layer 416, and a second layer of PEEK 414 may be disposed over layer 418. The use of multiple layers of PEEK 414-416 and aluminum 418-420 may provide the same mechanical and/or moisture-resistance properties of a single layer each of PEEK and aluminum in pouch 310 at a lower overall thickness. Additional layers of PEEK and/or aluminum may also be added to pouch 410 to further improve the puncture and/or moisture resistance of pouch 410 and/or reduce the thickness of pouch 410.

Those skilled in the art will appreciate that other modifications to pouches 310 and 410 of FIGS. 3-4 may be made to adjust the properties and/or thicknesses of the pouches. For example, one or more layers of aluminum in a pouch may be replaced with a different metal that is thinner and/or provides better moisture resistance than aluminum. In addition, changes to the chain length and/or branching of the PEEK material used in one or more layers of PEEK in the pouch may allow the mechanical properties of the PEEK material to be adapted for use with different types of batteries, portable electronic devices, and/or environments.

Figure 5:
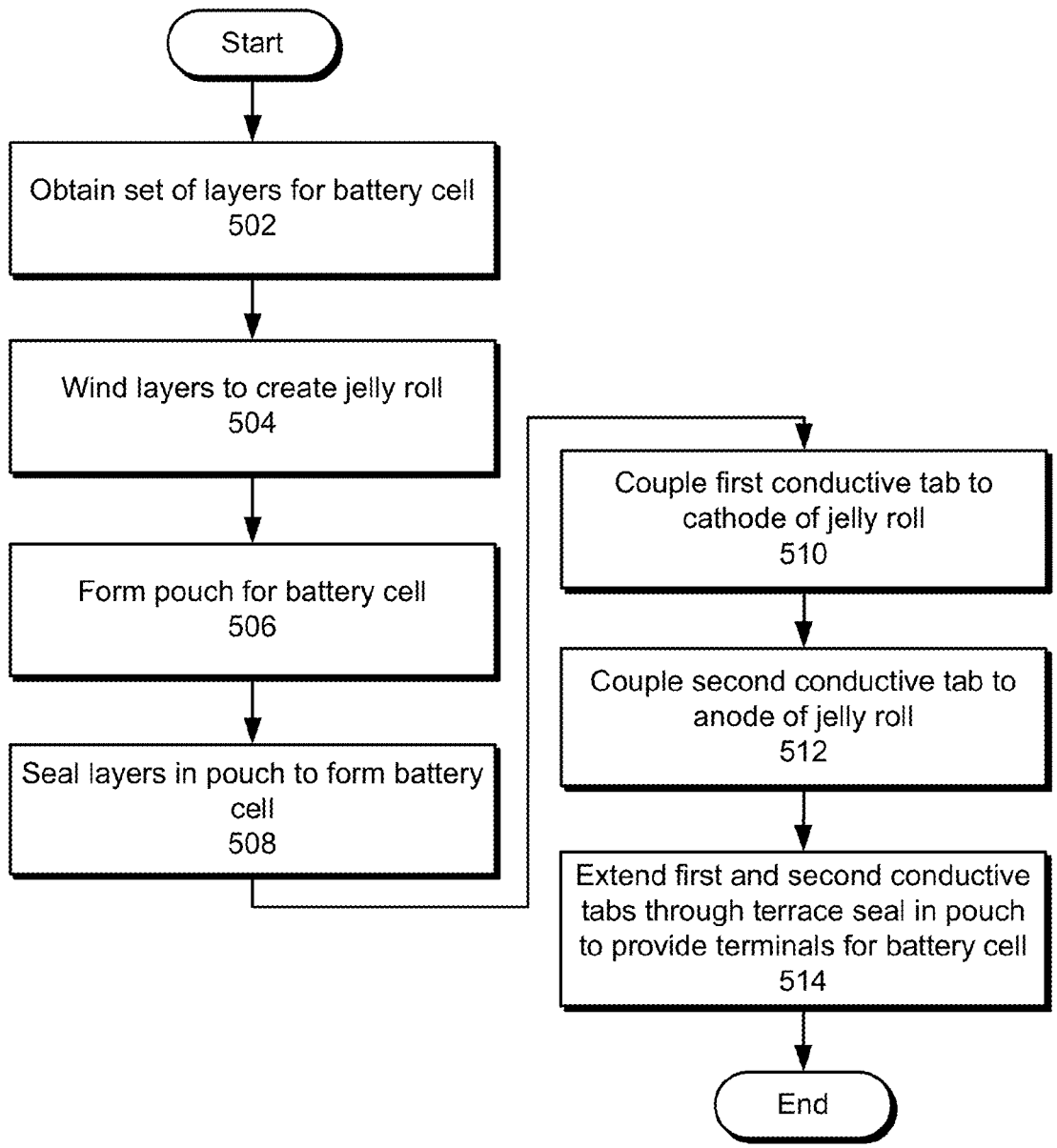
FIG. 5 shows a flowchart illustrating the process of manufacturing a battery cell in accordance with the disclosed embodiments.

FIG. 5 shows a flowchart illustrating the process of manufacturing a battery cell in accordance with the disclosed embodiments. In one or more embodiments, one or more of the steps may be omitted, repeated, and/or performed in a different order. Accordingly, the specific arrangement of steps shown in FIG. 5 should not be construed as limiting the scope of the embodiments.

First, a set of layers for the battery cell is obtained (operation 502). The layers may include a cathode with an active coating, a separator, and an anode with an active coating. Next, the layers are wound to create a jelly roll (operation 504). The winding step may be skipped and/or altered if the layers are used to create other battery cell structures. For example, the layers may be stacked to create a bi-cell and/or stacked-cell structure instead of wound to create the jelly roll.

A pouch for the battery cell is also formed (operation 506). The pouch may include one or more layers of PEEK, and optionally one or more layers of aluminum and/or a layer of polypropylene. For example, the pouch may include a first layer of aluminum disposed between a first layer of PEEK and a layer of polypropylene. The first layer of aluminum may have a thickness in the range of 25-30 microns, the layer of polypropylene may have a thickness in the range of 15-25 microns, and the first layer of PEEK may have a thickness in the range of 5-10 microns. To form the pouch, the layer of aluminum may be bonded to the layer of PEEK using an adhesive and/or a vapor-deposition technique. The pouch may also include a second layer of aluminum and/or PEEK, with the first layer of PEEK disposed between the two layers of aluminum and the second layer of PEEK disposed over the top layer of aluminum. If multiple layers of aluminum and/or PEEK are used in the pouch, the layers may provide the same puncture and/or moisture resistance of one layer of aluminum and one layer of PEEK at a reduced thickness.

To improve the mechanical properties of the layer(s) of PEEK, a scrim may be embedded in the PEEK material of each layer of PEEK. Multi-laminate layers of PEEK may further allow the layer(s) of aluminum to be omitted from the pouch. As a result, a cup in the pouch to accommodate the cathode, anode, and separator layers of the battery cell may be formed using a vacuum-forming technique instead of a punching technique that may form cracks in one or more layers of the pouch.

The layers of the battery cell are then sealed in the pouch to form the battery cell (operation 508). For example, the battery cell may be formed by placing the cathode, anode, and separator layers into the pouch, filling the pouch with electrolyte, and forming side and terrace seals along the edges of the pouch. The side and terrace seals may be formed using a heat seal and/or a laser seal.

To complete the battery cell, a first conductive tab is coupled to the cathode of the jelly roll (operation 510), and a second conductive tab is coupled to the anode of the jelly roll (operation 512). The first and second conductive tabs are then extended through seals in the pouch to provide terminals for the battery cell (operation 514).

Figure 6:
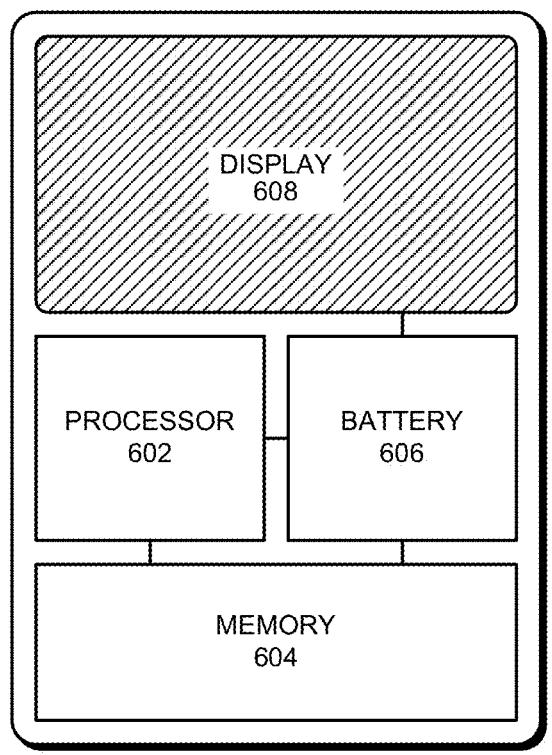
FIG. 6 shows a portable electronic device in accordance with the disclosed embodiments.

The above-described rechargeable battery cell can generally be used in any type of electronic device. For example, FIG. 6 illustrates a portable electronic device 600 which includes a processor 602, a memory 604 and a display 608, which are all powered by a battery 606. Portable electronic device 600 may correspond to a laptop computer, mobile phone, personal digital assistant (PDA), tablet computer, portable media player, digital camera, and/or other type of battery-powered electronic device. Battery 606 may correspond to a battery pack that includes one or more battery cells. Each battery cell may include a set of layers sealed in a pouch, including a cathode with an active coating, a separator, and/or an anode with an active coating.

The battery cell may also include a flexible pouch containing one or more layers of PEEK. The layer(s) of PEEK may reduce the thickness of the pouch over those of conventional pouches for battery cells while maintaining the same mechanical properties and/or moisture resistance as the conventional pouches. In turn, the pouch may enable an increase in the volumetric energy density of the battery cell over those of battery cells enclosed in the conventional pouches.

The foregoing descriptions of various embodiments have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention.

What is claimed is:

1. A battery cell, comprising:
    a set of layers, comprising a cathode with an active coating, a separator, and an anode with an active coating; and
    a pouch enclosing the layers, comprising:
        a first layer of polyether ether ketone (PEEK);
        a first layer of aluminum;
        a layer of polyurethane; and
        a layer of polypropylene;
        wherein the first layer of aluminum has a thickness in the range of 25-30 microns, and
        wherein the layer of polypropylene has a thickness in the range of 15-25 microns.

2. The battery cell of claim 1, wherein the first layer of aluminum is disposed between the first layer of PEEK and the layer of polypropylene.

3. The battery cell of claim 1, wherein the pouch further comprises:
    a layer of adhesive disposed between the first layer of PEEK and the first layer of aluminum.

4. The battery cell of claim 1,
    wherein the pouch further comprises a second layer of aluminum, and
    wherein the first layer of PEEK is disposed between the first and second layers of aluminum.

5. The battery cell of claim 1, wherein the first layer of PEEK has a thickness in the range of 5-10 microns.

6. The battery cell of claim 1, wherein the pouch further comprises a second layer of PEEK.

7. The battery cell of claim 1, wherein the first layer of PEEK comprises a PEEK material and a scrim, which comprises PEEK filament.

8. A portable electronic device, comprising:
    a set of components powered by a battery pack; and
    the battery pack, comprising:
        a battery cell, comprising:
            a set of layers, comprising a cathode with an active coating, a separator, and an anode with an active coating; and
            a pouch enclosing the layers, comprising a first layer of polyether ether ketone (PEEK), a first layer of aluminum, a layer of polyurethane, a layer of polypropylene,
    wherein the first layer of aluminum has a thickness in the range of 25-30 microns, and
    wherein the layer of polypropylene has a thickness in the range of 15-25 microns.

9. The portable electronic device of claim 8, wherein the first layer of aluminum is disposed between the first layer of PEEK and the layer of polypropylene.

10. The portable electronic device of claim 8,
    wherein the pouch further comprises a second layer of aluminum, and
    wherein the first layer of PEEK is disposed between the first and second layers of aluminum.

11. The portable electronic device of claim 8, wherein the first layer of PEEK has a thickness in the range of 5-10 microns.

12. The portable electronic device of claim 8, wherein the pouch further comprises a second layer of PEEK.

13. The portable electronic device of claim 8, wherein the first layer of PEEK comprises a PEEK material and a scrim, which comprises PEEK filament.

14. The battery cell of claim 2, wherein the first layer of PEEK is disposed between the first layer of aluminum and the layer of polyurethane.

15. The battery cell of claim 1, wherein the pouch further comprises:
    a second layer of PEEK;
    a second layer of aluminum;
    wherein the first layer of PEEK is disposed between the first and second layers of aluminum; and
    wherein the second layer of PEEK is disposed between the second layer of aluminum and the layer of polyurethane.

16. The battery cell of claim 15, wherein the pouch further comprises a layer of polypropylene.

17. The battery cell of claim 16, wherein the first layer of aluminum is disposed between the first layer of PEEK and the layer of polypropylene.

\* \* \* \* \*